Oct. 8, 1940.                F. S. SMITH                2,217,298
          APPARATUS FOR CONTROLLING THE FLOW OF A FLUID PRODUCT
                    Filed Oct. 26, 1937           3 Sheets-Sheet 1
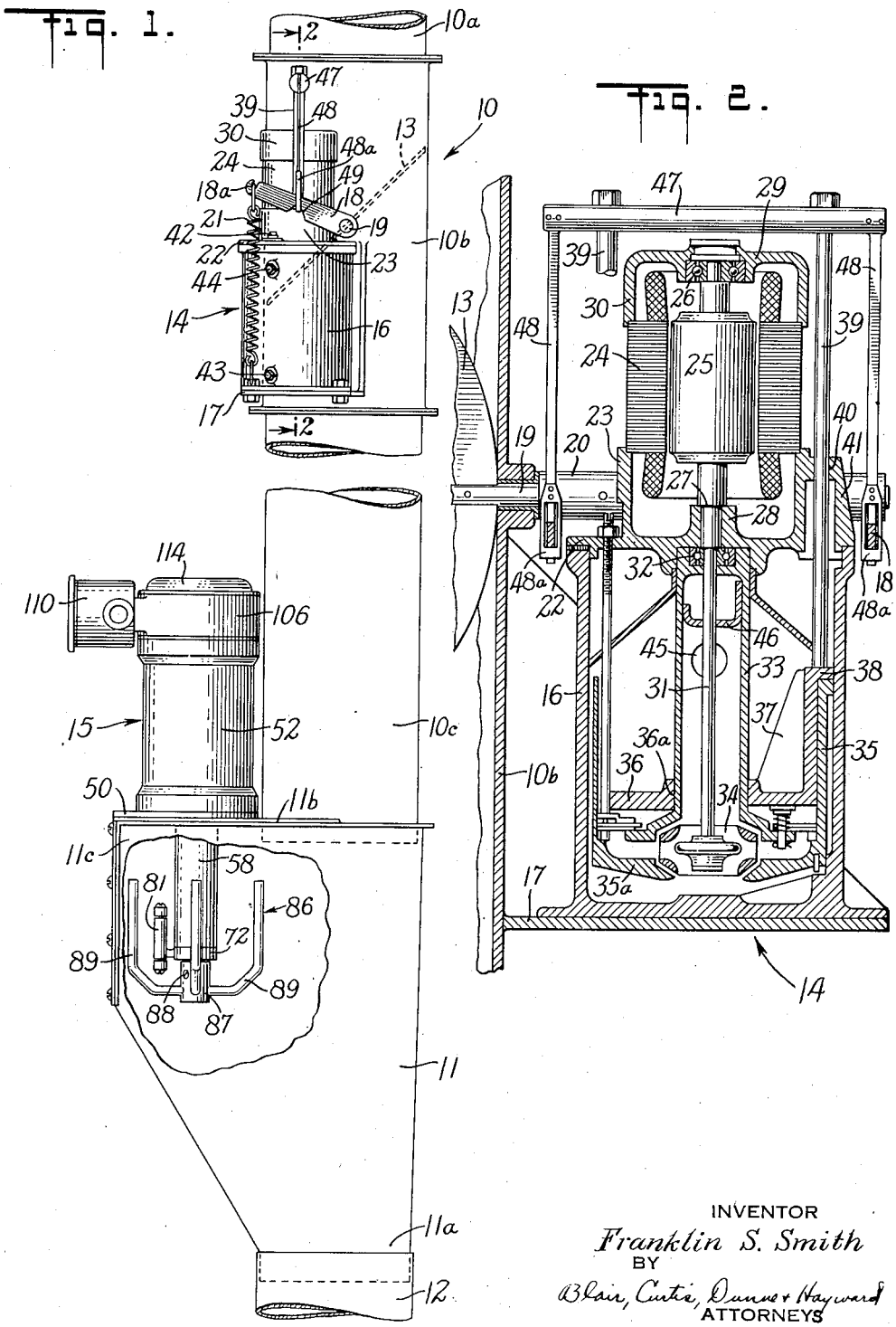
INVENTOR
Franklin S. Smith
BY
Blair, Curtis, Dunne & Hayward
ATTORNEYS

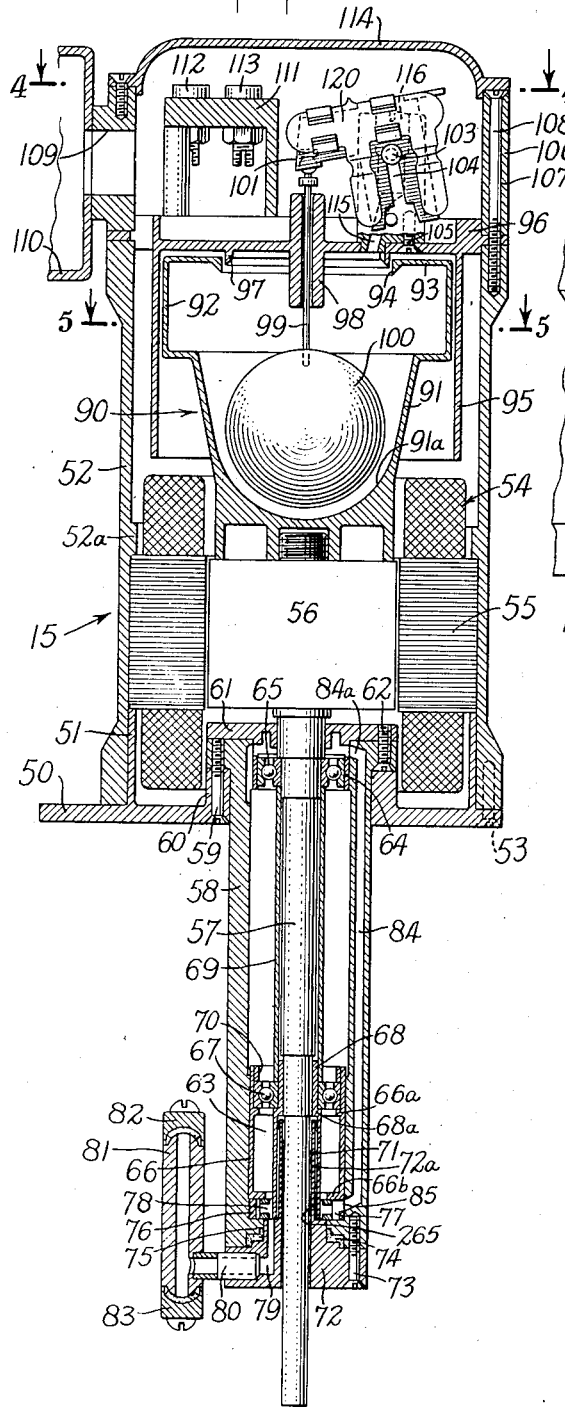

Oct. 8, 1940.   F. S. SMITH   2,217,298
APPARATUS FOR CONTROLLING THE FLOW OF A FLUID PRODUCT
Filed Oct. 26, 1937   3 Sheets-Sheet 3

INVENTOR
Franklin S. Smith
BY
Blair, Curtis, Dunne + Hayward
ATTORNEYS

Patented Oct. 8, 1940

2,217,298

UNITED STATES PATENT OFFICE 2,217,298

APPARATUS FOR CONTROLLING THE FLOW OF A FLUID PRODUCT

Franklin S. Smith, New Haven, Conn.

Application October 26, 1937, Serial No. 171,034

16 Claims. (Cl. 221—118)

This invention relates to apparatus for controlling the flow of fluids and especially granular solids such as grain or similar products.

One of the objects of this invention is to provide apparatus for controlling the flow of a product such as grain, which is simple and inexpensive in construction and operation, and which is sturdy and durable under conditions of rigorous use. Another object is to provide apparatus of the above nature by which the flow of grain through a conduit is effectively controlled in accordance with the level of grain in a delivery hopper. Another object is to provide apparatus of the above nature which is thoroughly reliable in operation and which is quickly responsive to a variable volumetric condition of the product. Another object is to provide apparatus of the above nature by which grain or the like can be delivered to a packaging or processing device without risking the clogging or jamming of such device by an excessive flow of grain. Another object is to provide a method of controlling the flow of a product such as grain, for example, which is practical and reliable and by which the flow of the product may be predetermined as to rate and volume. Another object is to provide a method of the above nature of restricting the level of the product to a predetermined level when the flow thereof from an outlet is stopped or restricted. Other objects will be in part apparent and in part pointed out hereinafter.

The invention accordingly consists in the features of construction, combination of elements, arrangements of parts and in the several steps and relation and order of each of the same to one or more of the others, all as will be illustratively described herein, and the scope of the application of which will be indicated in the following claims.

In the drawings, in which are shown several of the various possible embodiments of the invention, Figure 1 is an elevation of a grain conduit and hopper with controls therefor, a portion of the hopper being broken away;

Figure 2 is an enlarged sectional elevation of the valve controller taken along the line 2—2 of Figure 1;

Figure 3 is an enlarged sectional elevation of another portion of the controlling apparatus;

Figure 4 is a horizontal section taken along the line 4—4 of Figure 3;

Figure 5 is a horizontal section taken along the line 5—5 of Figure 3;

Figure 6:
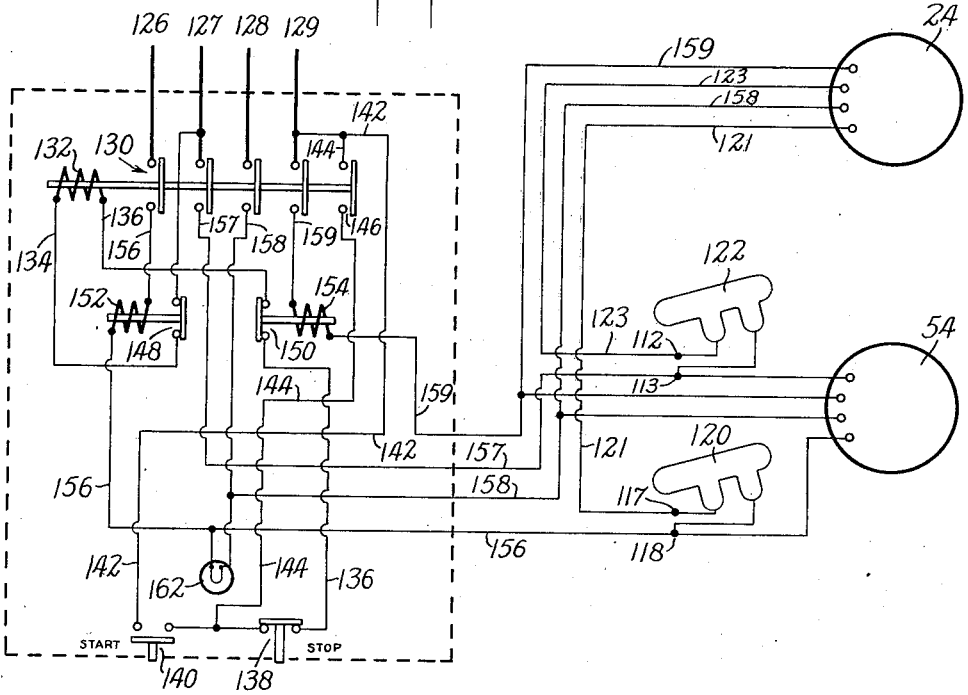
Figure 6 is a diagrammatic indication of an electric circuit for controlling my apparatus; and, Figure 7 is a diagrammatic indication of a modified controlling circuit.

Many devices which package or process a product such as grain are generally provided with a hopper or some sort of conduit through which the product flows to the packaging or processing machine. To prevent the conduit, hopper and machine from becoming clogged or jammed, it is often advisable to restrict or stop entirely the flow of the product to the delivery hopper. To this end various mechanisms have been devised which are responsive to the level of the product in the hopper to regulate the flow of product thereto. In many instances, however, these level responsive devices or controls operate indifferently because of structural deficiencies and because they do not respond or react promptly to the varying volumetric condition of the product in the hopper. Accordingly, the hopper and conduit are apt to become too full to the detriment of the packaging or processing machine. Still other devices of this nature depend entirely upon mechanical linkages or controls which respond slowly because of undue friction, and which in time fail to close the supply conduit. Still other level responsive controls have insufficient closing power and consequently when closed permit a leakage of the product. Other devices of this nature do not or can not respond to a lowering of the product level to permit a resumption of flow through the supply conduit. Accordingly, another object of this invention is to provide a method and apparatus which will obviate the above conditions in addition to many others.

Referring now to Figure 1 of the drawings, a supply conduit generally indicated at 10 is preferably formed of sections 10a, 10b, and 10c. Section 10a may be suitably connected to a source of supply (not shown) and section 10c may be suitably connected to a supply hopper 11, the bottom 11a of which connects with an inlet pipe 12 of a packaging or processing machine (not shown). Section 10b of conduit 10 pivotally encloses a butterfly valve 13 which is operated, as will be described in greater detail below, by a control generally indicated at 14. The top 11b of hopper 11 supports a product level responsive device generally indicated at 15, device 15 being electrically driven and electrically connected to control 14 to operate the control. When the level of the product in hopper 11 rises above a predetermined point, level responsive device 15 is affected so as to activate control 14 to close butterfly valve 13, all as will be described in greater detail below.

Still referring to Figure 1, control 14 includes a casing 16 bolted or otherwise secured to a platform 17 secured to and extending from conduit section 10b. A lever 18 is connected to one end of a pin 19, which is pivotally mounted in a journal 20 (Figure 2) extending from conduit section 10b, butterfly valve 13 being connected to the other end of pin 19. The free end 18a (Figure 1) of lever 18 is slotted to receive one end of a spring 21, whose other end is suitably anchored adjacent the bottom of casing 16, spring 21 thus constantly urging lever 18 in a counter-clockwise direction to bias butterfly valve 13 toward an open position. Upon actuation of control 14 in response to level responsive device 15, lever 18 is pulled in a clockwise direction against the bias of spring 21 to move butterfly valve 13 into its closed or dotted line position, as shown in Figure 1.

As noted above, control 14 (Figure 2) includes casing 16, on the top of which a plate 22 is secured. Plate 22 includes a cupped portion 23 which conveniently supports and partially encloses a motor 24 having an armature or shaft 25 whose upper end is borne preferably in a ball bearing 26 and the lower end of which is reduced as at 27 to provide a shoulder which rests against a boss 28 preferably formed integrally with plate 22 and extending into cup portion 23. Ball bearing 26 is conveniently retained within a suitable cup-shaped housing 29, the sides 30 of which enclose the upper end of motor 24. Preferably the lower end 31 of shaft 25 is further reduced and is borne at its upper end in a ball bearing 32 mounted in the top of a sleeve 33. The lower end of reduced portion 31 of the armature has secured thereto an impeller 34, which rotates with the armature between the bottom of sleeve 33 and the bottom 35a of a cup-shaped part 35 suitably secured in casing 16. A plunger 36 is slidably mounted within cup 35 and has a bore 36a through which sleeve 33 extends. Plunger 36 has a web 37 provided at its top with a shoulder 38 on which a rod 39 rests, rod 39 extending through a bore 40 suitably formed in a projection 41 of plate 22.

As is better shown in Figure 1, casing 16 has an oil inlet plug 42, a drainage plug 43 and an oil level indicating plug 44. Oil may thus be introduced into control 14 through plug 42 until the level indicated by plug 44 is reached. Referring back to Figure 2, it may be seen that oil introduced into control 14, as noted, fills casing 16 and accordingly submerges cup 35, impeller 34, plunger 36, and a portion of sleeve 33. The upper end of sleeve 33 is provided with a hole 45 and a gland 46 preferably surrounds armature extension 31 and the upper end of sleeve 33 to prevent flow of oil upwardly along armature shaft 31. It may now be seen that upon actuation of control motor 24, impeller 34 is rotated to draw the oil from above plunger 36 through opening 45 and down through sleeve 33, causing plunger 36 to rise and force rods 39 upwardly.

A cross-head 47 is suitably bolted to rods 39, and as is better shown in Figure 1, has secured thereto flexible straps 48 to the lower ends of which are affixed stirrups 48a which engage notches 49 in levers 18. Thus, when rods 39 are forced upwardly as heretofore described, straps 48 with stirrups 48a are also raised to pivot levers 18 in a clockwise direction to swing butterfly valve 13 to its closed position and thus prevent the flow of any product downwardly through conduit 10. When control motor 24 (Figure 2) ceases to be energized, plunger 36 is free to sink by gravity, and under the impulses of springs 21 (Figure 1) pull levers 18 counter-clockwise and accordingly force straps 48 with stirrups 48a, rods 39 and cross head 47 downwardly. This movement of lever 18 opens butterfly valve 13.

Hopper 11 (Figure 1) is preferably substantially larger than conduit 10 and accordingly includes a portion 11c offset from the axis of conduit 10. As noted above, level responsive device 15 is mounted on top 11b of the hopper, and as is more clearly shown in Figure 3, includes a bottom plate or support 50 which is secured in any suitable manner to hopper top 11b (Figure 1). Preferably plate 50 (Figure 3) is annular in form and includes a cylindrical projection 51, about which a cylindrical cover or housing 52 is disposed to provide a housing for mechanism to be described. Housing 52 is secured to plate 50 by screws 53.

A motor generally indicated at 54 is disposed within housing 52 and includes a stator core 55 which is supported by the upper edge of cylindrical projection 51. A projection 52a formed on housing 52 bears against the upper edge of stator core 55 and when housing 52 is secured to plate 50 by screws 53, motor 54 is securely clamped in operative position. Motor 54 also includes a rotor 56 having a shaft 57, rotatably secured within a sleeve or tube 58, which is secured as by a screw 59 to a projection 60 of plate 50. A cover plate 61 is secured by a screw 62 to the top of tube 58 and with the tube forms a reservoir 63, the purpose of which is pointed out hereinbelow.

A bushing 64 is preferably pressed into the upper end of tube 58, and receives a ball bearing 65, the inner face of which carries the upper end of shaft 57. The lower end of tube 58 also preferably has a bushing 66 disposed therein, and the upper end of this bushing receives a ball bearing 67. A pump impeller 78 includes an upper tubular portion 68 which is placed about shaft 57 preferably substantially centrally thereof, bearing 67 being disposed between portion 68 and bushing 66. To maintain ball bearings 65 and 67 in proper operative position with respect to shaft 57, I provide a sleeve 69 whose upper end bears against ball bearing 65, and whose lower end bears against ball bearing 67 to hold this bearing against suitable shoulders 66a and 68a provided respectively on bushing 66 and portion 68. Further to secure ball bearing 67 in its operative position, I have provided a ring 70 which is pressed into the upper end of bushing 66 against the outer face of bearing 67, thus to hold the bearing against shoulders 66a and 68a.

The upper tubular portion 68 of pump impeller 78 is tightly fitted, or if desired may be keyed to shaft 57 and accordingly rotates with the shaft. This tubular portion includes a downwardly extending enlarged portion 71 with an inside diameter sufficient to provide a space between portion 71 and shaft 57. This space receives the cylindrically formed upper end or quill 72a of a bottom cap 72 which is secured to the lower end of tube 58 by a screw 73. Suitable packing 74 is preferably disposed between cap 72 and tube 58 to provide an oil seal therebetween. The bottom of tube 58 is preferably provided with a projecting shoulder 75, and a ring 76 is disposed in the bottom of the tube on the shoulder. Bushing 66 has a bottom flange 66b which rests on the top of ring 76 and with tube shoulder 75 forms a housing 77 which receives pump impeller 78. As pump impeller portion 68 is secured to and rotates with shaft 57, rotation of the shaft imparts rotation to pump impeller 78 within housing 77.

Bottom cap 72 has a channel 79 communicating with a pipe 80 disposed within the cap. The end of pipe 80 communicates with a vertical tubular member 81 provided at its top and bottom respectively with detachable caps 82 and 83 through which the tubular member may be filled and drained. Tubular member 81 communicates with space 77 by way of pipe 80 and channel 79. Thus the tubular member limits the height of oil level in reservoir 63 when motor 54 is at rest.

Tube 58 has a channel 84 formed therein which communicates with housing 77 through a hole 85 formed in ring 76. The upper end 84a of tube channel 84 opens into tube 58 directly above ball bearing 65. Upon rotation of shaft 57 and accordingly impeller 78, oil in reservoir 63 is drawn therefrom through annular opening 265 between upper shroud of pump impeller 78 and enlarged tubular portion 68, and is pumped through pump housing outlet 85 into vertical channel 84, thence through opening 84a above bearing 65. The oil passes through this bearing and then falls and drips through tube 58 upon and through bearing 67 to reservoir 63. Leakage of oil from the reservoir is prevented by quill 72a of bottom cap 72.

The lower end of shaft 57 has secured thereto a spider or feeler generally indicated at 86 (Figure 1), preferably comprising a hub 87 secured to shaft 57 (Figure 3) as by a set screw 88 (Figure 1). Feeler legs 89 of suitable number and configuration are secured to and extend from hub 87. Thus spider 86 may be rotated within the upper left-hand portion of hopper 11, as viewed in Figure 1, and this for a purpose described hereinafter.

As shown in Figure 3, a bowl generally indicated at 90 is affixed to rotor 56 in axial alignment therewith. Bowl 90 preferably comprises a substantially frusto-conical portion 91 having a rounded bottom 91a, and a substantially cylindrical portion 92 forming the top of bowl 90. Cylindrical portion 92 is partially covered over with a flange 93 having a downwardly directed edge 94.

Bowl 90, being affixed to rotor 56, rotates therewith and lies within the upper portion of housing or cover 52. The bowl also rotates within a cup-shaped projection 95 which lies within the upper part of housing 52 (see Figure 5) and which is preferably an integral part of a partition 96 (Figure 3). Partition 96 includes a downwardly projecting annular portion 97 which extends partially into the hole formed by flange edge 94. A tubular guide 98 is axially formed on partition 96 and extends above and below the partition to reciprocally receive a rod 99, to the lower end of which is secured a float 100, and whose upper end is secured to a cradle 101 of a pair of mercury switches 120 and 122 (see also Figure 4). Float 100 (Figure 3) lies within bowl portion 91 which receives a charge of oil or other suitable liquid through a channel 115 closed by a stopper 116 (Figures 3 and 4), for a purpose described hereinafter.

Cradles 101 is pivotally supported by a pin 103 (see Figure 4) which extends through the upper end of an arm 104 (Figure 3) anchored by a screw 105 to the upper surface of partition 96. A ring 106 has a plurality of screw clearance holes 107, through which screws 108 extend. These screws also extend through a portion of partition 96 and are threaded into the upper end of housing 52, thus to hold ring 106 and partition 96 in place on housing 52. Ring 106 also has a horizontal bore 109 through which electrical conductors may be led to a conductor box 110. A bracket 111 is secured to the top of partition 96, and this bracket mounts and insulates terminals 112, 113, 117 and 118 (Figure 4). Ring 106 thus encloses mercury switches 120 and 122 and terminal bracket 111, the enclosure thus formed being closed by a cap 114 secured to the top of ring 106.

As will be described in greater detail hereinbelow, mercury switches 120 and 122 are electrically connected to control 14 (Figure 1) so that tilting of the switches in clockwise direction, as viewed in Figure 3, completes circuits to control 14 to effect closing operation of butterfly valve 13. This clockwise motion of switches 120 and 122 is caused by the rising action of float 100 floating on oil which gathers in portion 91 of bowl 90 when the speed of rotation of bowl 90 sufficiently decreases or comes to rest, as will be later explained.

Motor 54 as shown is a two-phase induction motor of high motor resistance with resultant low running torque and relatively high starting torque. The motor is constantly energized during the operation of my product flow control apparatus, and accordingly spider 86 (Figure 1) is rotating in the upper portion of hopper 11 as long as it is free to do so. When, however, the level of the product, such as grain, for example, rises within hopper 11 to a point where it engages spider 86, the spider, because of the low running torque of its driving motor, rotates more slowly because of the resistance of the grain. If the product level continues to rise, a greater portion of spider 86 is engaged and accordingly its speed of rotation decreases. With reference to Figure 3, it will appear that as the spider, and accordingly motor rotor 56, slows down or stops, bowl 90 also rotates more slowly or stops.

Bowl 90, of course, rotates at the same rate as the motor rotor 56 and spider 86 (Figure 1). During the high speed rotation, the oil in bowl 90 (Figure 3) is forced by centrifugal action into cylindrical portion 92 thereof, thus permitting float 100 to rest in its bottom-most position, wherein mercury switches 120 and 122 are tilted to the left as shown in Figure 3.

Assuming that a change in the volumetric condition of the product occurs in hopper 11 (Figure 1) so that the product level rises to a point where a substantial portion of spider 86 is submerged, the rotation of the spider, and accordingly of motor rotor 56 (Figure 3) and bowl 90 is substantially decreased or stopped. This decrease in speed of rotation reduces the centrifugal force in bowl 90, permitting the oil to flow from cylindrical portion 92 into bowl portion 91, which causes float 100 and rod 99 to rise, thus tilting mercury switches 120 and 122 in clockwise direction (Figure 3) to activate control 14 (Figure 1) as pointed out above. Activation of control 14 causes butterfly valve 13 to close, shutting off the flow of product through conduit 10 to hopper 11. Thus the level of grain in hopper 11 can not rise beyond a predetermined point.

As the product level in hopper 11 falls from its predetermined high point, it offers less and less resistance to the rotation of spider 86, which accordingly rotates faster. As spider 86 rotates faster, bowl 90 (Figure 3) rotates faster, until the increased centrifugal action forces the oil from bowl portion 91 into bowl portion 92, permitting float 100 and rod 99 to drop and tilt mercury switches 120 and 122 in counterclockwise direction, as viewed in Figure 3. This movement of mercury switches 120 and 122 breaks the circuits to control 14 (Figure 1) and control motor 24 stops. Consequently impeller 34 (Figure 2) no longer forces oil beneath plunger 36, and the plunger, under the bias of gravity and springs 21 (Figure 1) falls. As the plunger falls, lever 18 swings counterclockwise, thus opening butterfly valve 13 to permit further flow of product through conduit 10 to hopper 11.

It should be noted that although level responsive device 15 (Figure 3) utilizes oil as a lubricating and actuating medium, there is little or no possibility of the oil interfering with the operation of motor 54 or leaking into hopper 11. The oil in bowl 90 is substantially completely encased, through the provision of depending edge 94 of flange 93 and projection 97 of partition 96 from which condensed oil vapor drips into bowl 90. Accordingly the oil is successfully retained within the bowl. Also, the bearing lubricating oil is effectively prevented from leaking from reservoir 63 by gasket 74 coacting with bottom cap 72, the quill 72a of which is overlapped by tubular portions of pump impeller 78; also by caps 82 and 83 with coacting gaskets.

It will now appear that a variation in the volumetric condition of the product in hopper 11 alters the operative condition of level responsive device 15, which results in the activation of control 14. When activated, control 14 operates valve 13 to change the rate of product flow through conduit 10.

Figure 6 shows one embodiment of the control circuit whereby valve control 14 is made responsive to mercury switches 120 and 122. Referring to the upper left-hand portion of this figure, the illustrative showing is of a two-phase, sixty cycle source of power, with one phase between power service wires 126 and 128 and the other phase between service wires 127 and 129. Service wires 126, 127, 128 and 129 are connected respectively to conductors 156, 157, 158 and 159 through the various switch elements of a gang-switch, generally indicated by the numeral 130.

Gang-switch 130 is normally biased to open switch position and is operated to closed switch position by a solenoid 132 which, in turn, is energized by connecting it across phase 127—129. The connection with conductor 127 is through a conductor 134, and the connection with conductor 129 is through a lead 136, a stop switch 138, a starting switch 140, and a lead 142. Starting switch 140 and lead 142 are by-passed by a lead 144 and one switch element 146 of the gang-switch 130. Thus, when starting switch 140 is actuated so as to energize solenoid 132 and close gang-switch 130, switch element 146 is closed so that starting switch 140 may be allowed to move to open switch position without de-energizing solenoid 132. However, when stop switch 138 is opened, solenoid 132 will be de-energized and gang-switch 130 will be withdrawn to open position.

A pair of overload switches 148 and 150 are connected in leads 134 and 136, respectively, switch 148 being actuated by solenoid 152 in lead 156, and switch 150 being actuated by solenoid 154 in lead 159. Thus, an overload current in phase 126—128 will break the circuit of solenoid 132 by opening switch 148, and, in a like manner, an overload current in phase 127—129 will break this solenoid circuit by opening switch 150.

Leads 156, 158, 157 and 159 are connected directly to motor 54 and leads 158 and 159 are connected directly to motor 24. In addition to this, leads 156 and 157 are connected to terminals 118 and 113, respectively, and through these terminals to switches 120 and 122, respectively. The other terminals 117 and 112 of switches 120 and 122 are connected by way of leads 121 and 123 respectively to motor 24. Thus, when these switches are closed, motor 24 is controlled directly by gang-switch 130, and when these switches are open both phases of the power supply are cut off from motor 24. Of course, motor 54 operates directly under the control of gang-switch 130. A pilot light 162 is connected between leads 156 and 158 so as to indicate when this circuit is energized.

It is thus seen that when starting switch 140 is actuated so as to close gang-switch 130, motor 54 is energized and will be under the control of switches 120 and 122, and pilot light 162 indicates this condition. If hopper 11 is free of material, motor 54 immediately starts rotation, and the oil in bowl 90 (Figure 3) rises to cylindrical portion 92 thereof. This permits float 100 to drop and open switches 120 and 122, making motor 24 inoperative. As described above, this permits springs 21 and gravity (Figure 1) to retain butterfly valve 13 in the open position.

If at any time material accumulates in hopper 11 to cut down the speed of motor 54 and bowl 90, float 100 rises to close switches 120 and 122 and start motor 24. This closes butterfly valve 13 and stops the flow of the product in the manner explained above.

Figure 7:
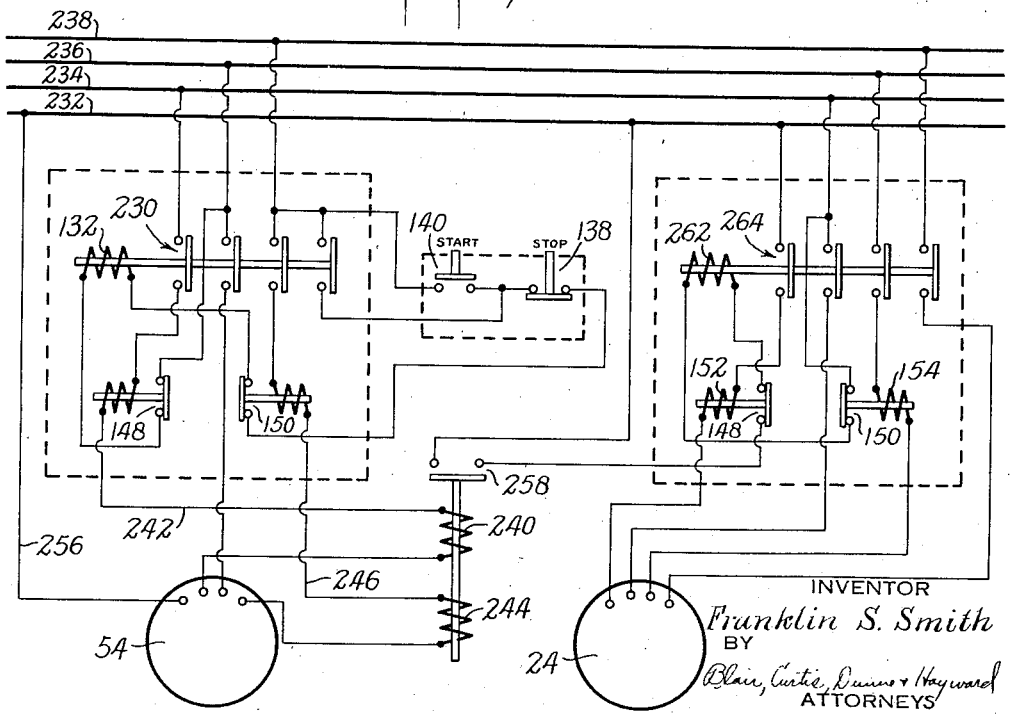

A modified form of control circuit is shown in Figure 7, with a two-phase source of power similar to that shown in Figure 6, one phase being between leads 232 and 234, and the other between leads 236 and 238. Lead 232 is connected directly to motor 54 by means of a lead 256 and the leads 234, 236 and 238 are connected to motor 54 through a gang-switch 230. Gang-switch 230 is similar to gang-switch 130 and is provided with an operating solenoid 132, overload switches 148 and 150, a starting switch 140, and a stop switch 138.

A solenoid 240 is connected in lead 242 of phase 232—234 and a solenoid 244 is connected in lead 246 of phase 236—238. Solenoids 240 and 244 are provided with a common core and when energized sufficiently cooperate to close a switch 258, which is normally biased to open position. Switch 258 is the control switch for motor 24 and when this switch is closed, solenoid 262 is energized so as to close gang-switch 264. Gang-switch 264 is similar to gang-switch 230 and when effective connects leads 232, 234, 236, and 238 to motor 24. Suitable overload switches 148 and 150 are provided in the circuit of solenoid 262 operated by solenoids 152 and 154, respectively, in the two phases.

To operate this embodiment, starting switch 140 is actuated so as to energize solenoid 132 and close gang-switch 230. This starts rotation of motor 54 and operation continues until material rises in the hopper to a point sufficient to interfere with the movement of spider 86 (Figure 1). When such interference occurs, the currents in the two phases of motor 54 increase and upon the attainment of a certain predetermined value of these two currents, switch 258 is closed. Closing switch 258 energizes solenoid 262 so as to close gang-switch 264 and causes rotation of motor 24 and consequent closing of butterfly valve 13. Switch 258 remains closed until the current in the two phases decreases due to a free condition of the hopper. The entire operation may be discontinued at any time by operating stop switch 138.

As many possible embodiments may be made of the mechanical features of the above invention, and as the art herein described might be varied in various parts, all without departing from the scope of the invention, it is to be understood that all matter hereinabove set forth, or shown in the accompanying drawings is to be interpreted as illustrative and not in a limiting sense.

I claim:

1. In apparatus of the character described, in combination, a conduit for accommodating the flow of a fluid product, a hopper connected to said conduit to receive said product, a product level responsive device including a rotating part disposed in said hopper to rotate about a vertical axis, said part being positioned whereby its rate of rotation is varied upon engagement with the product in said hopper when the level of said product rises, means operable for changing the rate of flow of product through said conduit, operating means for said first-mentioned means, and bowl and float means responsive to a variation in the rate of rotation of said part for activating said operating means whereby upon a rise of the product level in said hopper the flow of product through said conduit is stopped.

2. A product level responsive device comprising, in combination, a feeler, motive means for moving said feeler, a fluid receptacle associated with said motive means, said receptacle including a compartment adapted to receive fluid driven therein by centrifugal force, and a part disposed in said receptacle and movable in accordance with the disposition of fluid in the receptacle.

3. A product level responsive device comprising, in combination, a feeler, motive means for moving said feeler, a member associated with said motive means and subject to centrifugal force resulting from operation of said motive means, and an element movable in response to operation of said member.

4. In apparatus of the character described, the combination of, a feeler, a prime mover to move said feeler, switch means associated with said feeler, and float means associated with said switch means to open or close said switch in accordance with the speed of operation of said prime mover.

5. A product level responsive device comprising, in combination, a casing, motive means in said casing including a shaft extending therefrom, a feeler secured to said shaft, a bowl secured to said motive means within said casing, said bowl adapted to receive a supply of fluid, and a float mounted for axial movement in said bowl, said bowl being so shaped and said float being so positioned with respect to said bowl that the speed of said motive means in rotating said bowl determines the axial position of said float.

6. A product level responsive device comprising, in combination, motive means including a shaft, a feeler secured to said shaft, a bowl secured to said motive means, said bowl adapted to receive a supply of fluid, a float mounted for movement in said bowl, said bowl and float being so disposed that operation of said motive means forces said fluid away from said float, and a switch operatively connected to said float.

7. A product level responsive device comprising, in combination, a feeler, motive means for moving said feeler, means associated with said motive means and subject to centrifugal force resulting from operation of said motive means for exerting a force, means movable in response to the force exerted by said second-mentioned means, and a switch operatively connected to said movable means for operation thereby.

8. A product level responsive device comprising, in combination, a conduit, a hopper connected to said conduit, a feeler adapted to move in said hopper, an electric motor for moving said feeler, valve means to change a condition of material flow through said conduit, hydraulic means for operating said valve means, and means associated with said motor to effect operation of said hydraulic means, said last-mentioned means being dependent upon a change in the operative condition of said motor.

9. A product level responsive device comprising, in combination, a hopper, a movable feeler disposed in said hopper, an electric motor for operating said feeler, a conduit connected to said hopper, a valve in said conduit, hydraulic mechanism for operating said valve to open and close said conduit, an electric motor for operating said hydraulic mechanism, and switch means between said motors and responsive to a change in the operative condition of the first motor to affect the operation of the second motor.

10. In apparatus of the character described, in combination, a sensitizable feeler member adapted to respond to a variable condition, means operatively connected to said feeler member for sensitizing said member, the operative condition of said means being in turn sensitive to the response of said member, the operative condition of said means accordingly being sensitive to a variation in said condition, means operatively associated with said first-mentioned means and adapted to exert centrifugal force upon energization by said first-mentioned means, and means controlled by said centrifugal force for varying said condition.

11. In apparatus of the character described, in combination, a sensitizable feeler member adapted to respond to a variable condition, means operatively connected to said feeler member for sensitizing said member, the operative condition of said means being in turn sensitive to the response of said member, the operative condition of said means accordingly being sensitive to a variation in said condition, means operatively associated with said first-mentioned means and adapted to exert centrifugal force upon energization by said first-mentioned means, means for varying said condition, hydraulic means for operating said condition varying means, and means controlled by said centrifugal force for actuating said hydraulic means.

12. In apparatus of the character described, in combination, a sensitizable feeler member adapted to respond to a volumetric condition, means operatively connected to said feeler member for sensitizing said member, the operative condition of said means being in turn sensitive to the response of said member, the operative condition of said means accordingly being sensitive to a variation in said condition, means operatively associated with said first-mentioned means and adapted to exert centrifugal force upon energization by said first-mentioned means, a valve for varying said condition, a rotatable impeller for hydraulically operating said valve, and means controlled by said centrifugal force for actuating said impeller.

13. In a product level responsive device having a hopper and a conduit connected thereto, a feeler being disposed in the hopper and a valve being disposed in said conduit and operable to control the flow of material therethrough, the combination therewith of, means for operating said feeler, the operative condition of said means being in turn sensitive to the operative condition of said feeler, means energized by said operating means for exerting centrifugal force upon energization by said operating means, and means controlled by said centrifugal force for operating said valve.

14. In apparatus of the character described, in combination, a feeler, a motor for moving said feeler, means including a bowl and float which are relatively movable and operatively associated with said motor, and control means connected to said first-mentioned means and operable thereby upon relative movement between said bowl and float.

15. A product level responsive device comprising, in combination, a hopper and a feed conduit connected thereto, a valve operatively mounted in said conduit and operable between open and closed positions therein, a feeler movably mounted in said hopper, means sensitive to the operative condition of said feeler for exerting centrifugal force, and means responsive to said centrifugal force for varying the position of said valve in said conduit.

16. A product level responsive device comprising, in combination, a hopper and a feed conduit connected thereto, a valve operatively mounted in said conduit and operable between open and closed positions therein, a feeler movably mounted in said hopper, and electrical apparatus which is sensitive to the operative condition of said feeler with a controlling circuit effective for varying the position of said valve in said conduit and including a rotatable receptacle containing a body of liquid and means for rotating said receptacle to move said liquid by centrifugal force to open and close said circuit.

FRANKLIN S. SMITH.